March 6, 1951 W. G. ABBOTT, JR 2,544,122
MOTION MULTIPLYING MECHANISM
Filed July 21, 1944 2 Sheets-Sheet 1
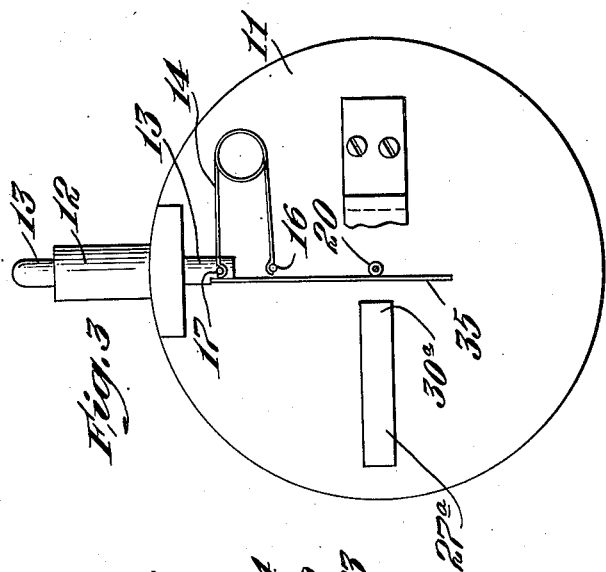
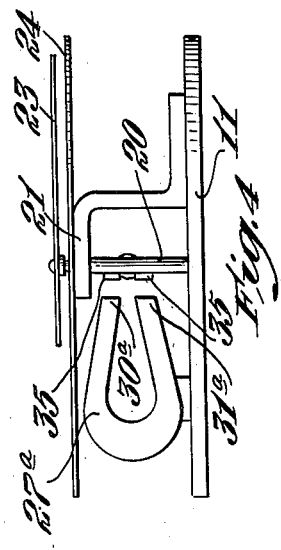
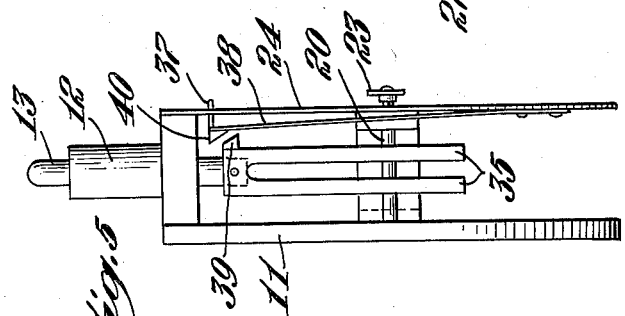
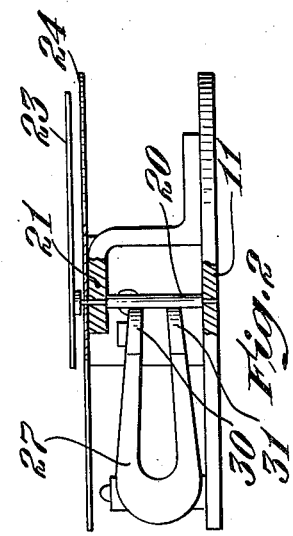
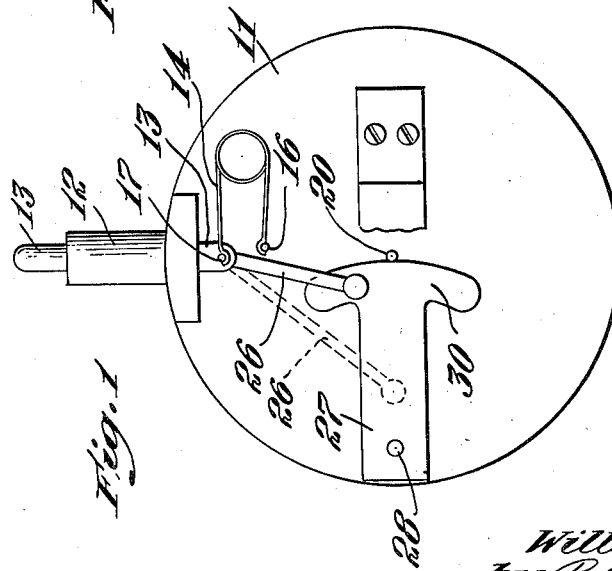
Inventor
William G. F. Abbott Jr.
by Roberts, Cushman & Groom
Attys.

March 6, 1951 W. G. ABBOTT, JR 2,544,122
MOTION MULTIPLYING MECHANISM
Filed July 21, 1944 2 Sheets-Sheet 2
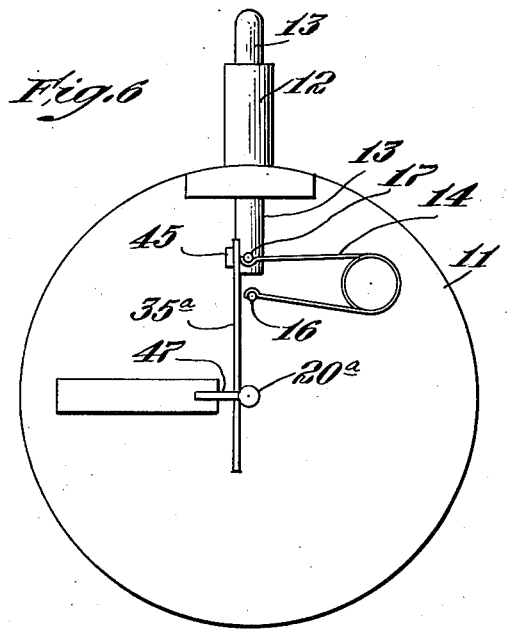
Fig. 6
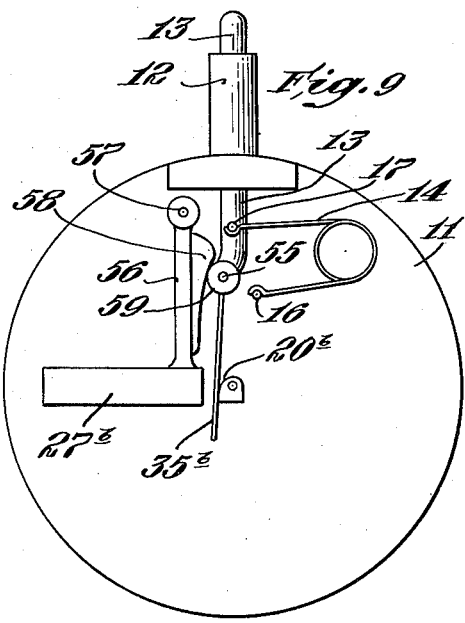
Fig. 9
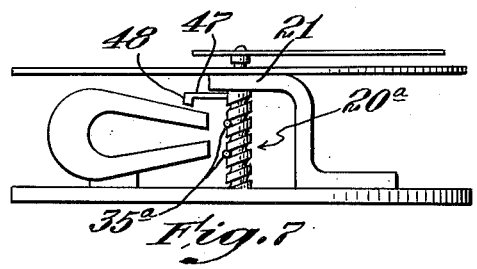
Fig. 7
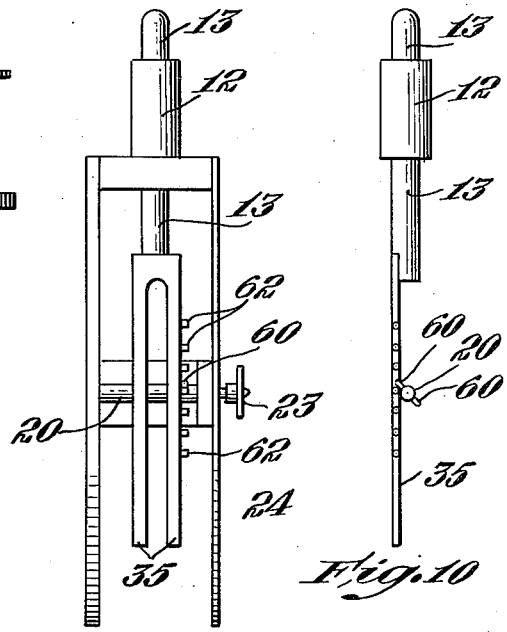
Fig. 10
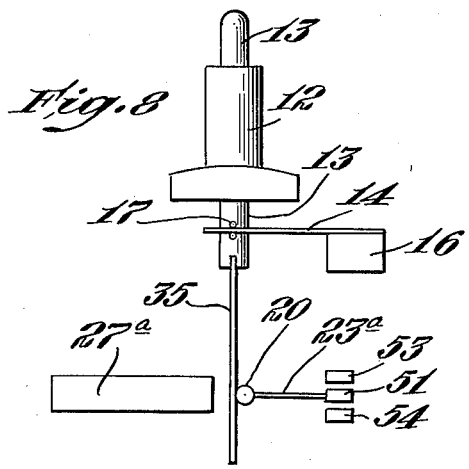
Fig. 8
Fig. 11
Inventor
William G. Abbott Jr
by Roberts, Cushman & Grove
Attys.

Patented Mar. 6, 1951

2,544,122

UNITED STATES PATENT OFFICE 2,544,122

MOTION MULTIPLYING MECHANISM

William G. Abbott, Jr., Wilton, N. H.

Application July 21, 1944, Serial No. 546,030

21 Claims. (Cl. 74—210)

This invention is applicable to indicating measuring, recording, controlling, or similar instruments, and is particularly adapted to provide an instrument which responds to a small movement, as for instance, at a point of measurement, by a much greater movement of an indicating, recording or controlling member.

One of the principal objects of the invention is to provide an instrument in which a large magnification of movement can be secured consistently with smoothness of operation and simplicity of construction. The invention further aims to provide an accurate instrument capable of large magnification of movement, and well adapted to withstand shock.

The usual indicating instrument of the kind in which a large magnification of movement is secured contains a large number of gears in order to obtain the desired degree of magnification. In order to prevent back lash in the train of gearing, such gearing is often duplicated so that one set of gearing opposes the other set. Instruments of such kind have been subject to damage by accidental shock, and for this reason special buffers are often employed. My invention provides a very material simplification of construction, avoiding the complications of previous instruments of such kind.

Other objects of the invention and features of advantage and utility will be apparent from this specification and its accompanying drawings wherein the invention is explained by description and illustration of several examples.

The invention employs a strong frictional connection between a spindle and a spindle-driving member, the effectiveness of the frictional connection being due in large part to magnetic attraction between the spindle and the spindle-driving member. The spindle may be of small diameter, and may carry a rotatable element whose path extends to a very much larger diameter, so that a small movement of the spindle-driving member is greatly magnified and results in much larger movement of such rotatable element.

Notwithstanding the large magnification of movement, accuracy and smoothness of operation are secured by the firm magnetic adhesion between the spindle and the spindle-driving member which frictionally engages the spindle.

The invention, for simplicity of illustration and explanation, is shown and described as embodied in instruments having a very simple movable element to respond to the article or position to be measured, and also a very simple indicating or controlling element. It will readily be understood that dependent upon the article or position or condition to be measured, and dependent upon the type of indication, record or control that is desired, these elements may be considerably elaborated and modified.

By way of example, the invention is illustrated and described as applied to a size gauge which may be used to respond to the position of a surface of a part or article and hence measure the length or thickness of the part or article.

Referring to the accompanying drawings:

Fig. 1 is a plan view of a gauge according to the present invention with its dial and pointer removed to expose operating parts;

Fig. 2 is a side elevation partly in section, of the device of Fig. 1;

Fig. 3 is a view similar to Fig. 1 showing another form of the invention;

Fig. 4 is a side elevation of the device of Fig. 3;

Fig. 5 is a left side elevation of the device of Fig. 3, taken at right angles to the side elevation of Fig. 4, the magnet being removed in this view in order to expose parts behind it Fig. 6 is a view similar to Fig. 1 showing another form of the invention;

Fig. 7 is a side elevation of the device of Fig. 6;

Fig. 8 is a diagrammatic view of a device similar to that of Figs. 3, 4 and 5, in which the spindle carries an electric contact element;

Fig. 9 is a view similar to Fig. 1 showing another form of the invention;

Fig. 10 is a diagrammatic view, with certain parts omitted, of a device similar to that of Figs. 3, 4 and 5 in which the spindle is provided with teeth interengaging with portions of the spindle-driving member; and Fig. 11 is a left side elevation of the device of Fig. 10.

Referring to Figs. 1 and 2, the gauge of these figures is provided with a back plate 11 carrying a housing 12 in the nature of a sleeve within which is slidably mounted a reciprocable plunger 13. The plunger 13, of which the outer end is adapted to contact the article to be measured, is movable inwardly of the gauge against a suitable restoring force. In the various forms of the invention herein illustrated the restoring force is shown as being provided by a suitable spring, indicated at 14 in Fig. 1 wherein it is shown as mounted at 16 on the plate 11 and as pressing at 17 against the plunger 13.

A rotatable spindle 20 is pivotally mounted as shown in Fig. 2 in suitable bearings in the plate 11 and in a bracket 21, carried by the plate 11, and the rotatable indicating or controlling element, having the desired magnified movement is carried by this spindle. As shown in Fig. 2 such element carried by the spindle is a simple pointer 23 adapted to sweep over the surface of a suitably calibrated dial 24 which is carried by the bracket 21.

A connecting link 26 connects the inner end of the plunger 13 and a permanent magnet 27 in such manner that the opposite poles of the magnet are moved past the spindle 20, in frictional contact therewith as the plunger 13 reciprocates.

The magnet 27 is shown as pivotally mounted on the plate 11 by means of a pivot pin 28, and as having its two pole portions at 30 and 31 respectively formed with arcuate end surfaces, concentric with the axis of the pin 28 and in frictional engagement with the spindle 20 and spaced apart in a direction parallel to the axis of the spindle. To increase the length of movement which the plunger 13 and magnet 27 can make while poles 30 and 31 of the magnet are in frictional engagement with the plunger 20, these poles are preferably widened as indicated in Fig. 1 so that at the poles the magnet is substantially wider than elsewhere.

The magnet 27 in this form of the invention constitutes the spindle-driving member of the device, and also serves to cause the desired magnetic attraction between the spindle and such spindle-driving member. The poles 30 and 31 of the magnet 27 are held firmly against the spindle, so that the movement of the plunger 13 is transmitted smoothly and accurately to the spindle. The spindle is enabled to be of very small diameter, so that a large magnification of the motion of the plunger is secured.

The instrument is well adapted to withstand accidental shock. For example, when the plunger 13 is subjected to an accidental blow of sufficient force the spindle-driving member can slip with relation to the spindle, avoiding injury or breakage. The pointer and spindle can easily be turned backward with relation to the spindle-driving member and plunger to set the pointer at zero on the dial, or if desired the dial can easily be rotated to bring zero on the dial to the pointer.

If desired the motion of the plunger 13 may be still further magnified by having the connecting link 26 between the plunger and magnet connected to the magnet at a point near to the pivot pin 28, for example as shown in dotted lines in Fig. 1.

Referring to the modified form of device of Figs. 3, 4 and 5 the magnet herein indicated at 27ª is fixed to the rear plate 11 and is stationary, and located with its poles 30ª and 31ª directed toward the spindle and spaced apart in a direction parallel to the axis of the spindle. In this form of the device the magnet does not constitute the spindle-driving member but is employed to cause magnetic attraction between the spindle and a separate spindle-driving member. More particularly the magnet in this form of the device is employed to induce magnetism in the spindle so as to cause the spindle to attract a spindle-driving member 35 which is fixed to the plunger 13. Preferably the spindle-driving member 35 is comprised of two branches as shown in Figs. 4 and 5 which are disposed respectively opposite to the two poles 30ª and 31ª, respectively, of the magnet. This form of the device, which is preferred from the standpoint of lightness, is also advantageous in reducing the mass and momentum of the moving parts. This form of the device also affords the advantages of avoidance of injury or breakage upon the occurrence of shock, and the advantage of ease of turning the pointer to zero setting, as described above in connection with the device of Figs. 1 and 2.

The device of Figs. 3, 4 and 5 is shown as provided with mechanism for causing the pointer element which is rotated by the spindle to have a fixed zero or starting position. A pin 37 is adapted to stop the pointer 23 and hence the spindle at a predetermined position on return rotation of the pointer and spindle. Preferably this pin 37 is held retracted out of the path of the pointer excepting when the pointer is within one revolution of its starting position so as to permit the pointer and spindle to make more than one revolution. This may conveniently be accomplished by mounting the pin 37 on a spring 38 which tends to draw the pin 37 inwardly as shown in Fig. 5. A cam element 39 which moves with the spindle-driving element 35 is adapted to contact and press outwardly a similar cam element 40 associated with the pin 37 shortly before the end of the return movement of the spindle-driving member 35, thus projecting the pin 37 into the path of the return movement of the pointer 23.

If the instrument is jarred sufficiently to cause the spindle-driving member to slip with respect to the spindle as the spindle-driving member is moved inwardly, for example if a blow is accidentally imparted to the plunger 13, this has the effect of setting the pointer so that it comes against the stop pin 37 somewhat before the plunger 13 comes to the end of its return movement. The pointer is then detained in zero position by the stop pin 37, the spindle-driving member then shifting with relation to the spindle until the plunger completes its return movement, whereupon the plunger and pointer bear their original intended relation to each other.

The device of Figs. 6 and 7 is similar to that of Figs. 3, 4 and 5, and includes a modified form of mechanism for stopping the spindle at a predetermined position in its return movement. In this form of device the spindle indicated at 20ª is in the form of a screw, having spiral grooves spaced so as to receive within them two round rods 35ª which here constitute the spindle-driving member. These two round rods 35ª are pivotally connected to the plunger 13 as indicated at 45 (Fig. 6). As shown in Fig. 7 the two round rods 35ª are spaced apart approximately the same distance as the poles 30ª and 31ª of the magnet 27ª. In the return movement of the spindle 20ª and the rods 35ª, the rods 35ª move along the screw threads toward an end of the spindle at which the spindle carries a radially projecting arm 47 having a down-turned end portion 48. When the down-turned end portion 48 strikes the adjacent rod 35ª which is moved into its path, the return rotation of the spindle is thus stopped at a definite point.

As indicated above, various forms of indicating and controlling mechanism can be operated by the spindle. In Fig. 8, the spindle 20 is shown as carrying a radially-projecting arm 23ª having at its outer end an electrical contact element 51 which may form part of any electric control circuit, the rotation of the spindle 20 carrying the electric contact element 51 into contact with any one or more other electric contact elements, such for example as the stationary contact elements 53 and 54. The device of Fig. 8 is otherwise similar to that of Figs. 3, 4 and 5 excepting for a simplified form of spring 14.

The reciprocating motion of the plunger 13 may sometimes advantageously be modified as well as magnified in being transmitted to the rotatable spindle. In the form of device of Fig. 9, the spindle is provided, at the place where it is acted upon by the spindle-driving member 35ᵇ, with an eccentric portion which may be of cam-like shape as indicated at 20ᵇ. In this manner, reciprocation of the plunger 13 affects the spindle unequally in different parts of the movement of the plunger, and the movement of the plunger is thus modified as well as magnified in being transmitted to the spindle. The shape of the cam-like eccentric portion 20$^b$ may, for example, be such as to permit a dial having equal divisions to be employed to indicate unequal increments of movement of the plunger 13. In this form of device the spindle-driving member 35$^b$ is pivotally connected to the plunger by a pin 55 to assist the spindle-driving member to adapt itself to the surface of the eccentric portion 20$^b$.

In this form of device of Fig. 9 the magnet 27$^b$ operates, in the manner of magnet 27$^a$ of the devices of Figs. 3 to 7 to induce magnetism in the spindle to cause the spindle to attract the spindle-driving member. In the device of Fig. 9, the magnet is preferably provided with a supporting arm 56 which is pivotally mounted on a fixed pin 57 in such manner that the magnet is movable toward and away from the axis of the spindle. A cam 58 on the magnet-supporting arm 56 presses against a roller 59 on the reciprocating plunger 13, and this cam 58 is so shaped as to hold the magnet at an approximately constant distance from the adjacent surface of the rotatable eccentric portion 20$^b$ of the spindle in all positions of the plunger, spindle-driving member 35$^b$ and spindle.

In cases in which it is desired to prevent any relative displacement of the spindle and spindle-driving member with respect to each other, the spindle 20 may be provided with one or more teeth 60, as shown for example, in Figs. 10 and 11. These teeth may interchange with portions 62 of the spindle-driving member 35, thus preventing a displacement of the relative positions of the spindle and spindle-driving member, but retaining the smoothness of operation and large magnification of movement which results from the strong magnetic attraction between the spindle-driving member and spindle of small diameter.

The degree of magnification of movement obtained by the several forms of the invention can obviously be altered by change in the diameter of the portion of the spindle that is acted on by the spindle-driving member, or change in the radius of the pointer or other element operated by the spindle.

As illustrative of an instrument proportioned to have a magnification of movement of approximately 50 times, a gauge such as shown in Figs. 3 and 4 may for example have a spindle diameter of 0.0397 inch. A movement of the plunger 13 and spindle-driving member 35 of ⅛ inch will then rotate the spindle and pointer one revolution. On a 2-inch dial, the pointer will then traverse through 2×3.14 inches or 6.28 inches for ⅛ inch movement of the plunger and spindle-driving member, which constitutes a magnification of movement of approximately 50 times. Reduction of the diameter of the spindle, or increase in diameter of the dial and pointer will each further increase the magnification, and it is an important advantage of the invention that by reduction of diameter of the spindle a large degree of magnification can be secured without requiring any abnormally large diameter for the instrument and the pointer or other element operated by the spindle.

I claim:

1. A magnetically geared motion multiplying instrument of the class described comprising in combination a reciprocable member, a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a spindle-driving member movable by said reciprocable member and having frictional contact with the spindle, and means for causing a magnetic attraction between the spindle and said spindle-driving member.

2. A magnetically geared motion multiplying instrument of the class described comprising in combination a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a spindle-driving member having frictional contact with the spindle, and means for causing a magnetic attraction between the spindle and said spindle-driving member, said means including magnetic poles of opposite polarity directed toward the spindle and spaced apart in a direction parallel to the axis of the spindle.

3. A magnetically geared motion multiplying instrument of the class described comprising in combination a reciprocable member, a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a spindle-driving member movable by said reciprocable member and having frictional contact with the spindle, and a magnet disposed to induce magnetism in the spindle to cause the spindle to attract the spindle-driving member.

4. A magnetically geared motion multiplying instrument of the class described comprising in combination a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a reciprocating spindle-driving member movable past said spindle in frictional contact with the spindle, and a magnet disposed to induce magnetism in the spindle to cause the spindle to attract the spindle-driving member.

5. A magnetically geared motion multiplying instrument of the class described comprising in combination a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a reciprocating spindle-driving member movable past said spindle in frictional contact with the spindle, and magnetic means for inducing magnetism in the spindle to cause the spindle to attract the spindle-driving member, said magnetic means including magnetic poles of opposite polarity directed toward the spindle and spaced apart in a direction parallel to the axis of the spindle.

6. A magnetically geared motion multiplying instrument of the class described comprising in combination a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a reciprocating spindle-driving member movable past said spindle in frictional contact with the spindle, and magnetic means for inducing magnetism in the spindle to cause the spindle to attract the spindle-driving member, said magnetic means including magnetic poles of opposite polarity directed toward the spindle and spaced apart in a direction parallel to the axis of the spindle, and the spindle-driving member comprising two branches disposed respectively opposite to the two magnetic poles.

7. A magnetically geared motion multiplying instrument of the class described comprising in combination a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a reciprocating spindle-driving member movable past said spindle in frictional contact with the spindle, and a magnet spaced from the path of movement of the spindle-driving member and disposed to induce magnetism in the spindle to cause the spindle to attract the spindle-driving member.

8. A magnetically geared motion multiplying instrument of the class described comprising in combination a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a spindle-driving member movable against a restoring force and having frictional contact with the spindle, means for causing a magnetic attraction between the spindle and said spindle-driving member, and means for stopping the spindle at a predetermined position on return rotation of the spindle.

9. A magnetically geared motion multiplying instrument of the class described comprising in combination a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a spindle-driving member movable against a restoring force and having frictional contact with the spindle, means for causing a magnetic attraction between the spindle and said spindle-driving member, a further rotatable member connected to and rotated by the spindle, and an element adapted to contact with said further member to stop said further member and spindle in a predetermined angular position on return rotation of the spindle.

10. A magnetically geared motion multiplying instrument of the class described comprising in combination a rotatable spindle, a spindle-driving member movable against a restoring force and having frictional contact with the spindle, means for causing a magnetic attraction between the spindle and said spindle-driving member, a rotatable member connected to and rotated by the spindle, an element adapted to contact with said rotatable member to stop said rotatable member and spindle in a predetermined angular position on return rotation of the spindle, and means for automatically causing a shift between said element and the path of said rotatable member during the first revolution of said rotatable member from said predetermined angular position to remove said element from the path of said rotatable member thereby to permit said spindle and rotatable member to make more than one revolution.

11. A magnetically geared motion multiplying instrument of the class described comprising in combination a rotatable spindle, a spindle-driving member movable against a restoring force and having frictional contact with the spindle, means for causing a magnetic attraction between the spindle and said spindle-driving member, a rotatable member connected to and rotated by the spindle, and a stop element actuable by the spindle-driving member into the path of said rotatable member during return movement of the spindle-driving member.

12. A magnetically geared motion multiplying instrument of the class described comprising in combination a rotatable spindle, a spindle-driving member movable against a restoring force and having frictional contact with the spindle, means for causing a magnetic attraction between the spindle and said spindle-driving member, a rotatable member connected to and rotated by the spindle, a stop element movable into the path of return movement of the rotatable member, and cam mechanism actuable by the spindle-driving member during return movement of the spindle-driving member for causing the stop element to move into the path of return movement of the rotatable member.

13. A magnetically geared motion multiplying instrument of the class described comprising in combination a reciprocable member, a rotatable spindle, a rotatable member connected to and rotated by said spindle and extending to a circular path substantially larger than that of the spindle surface so as to have at said path a linear motion which is multiplied from that of the spindle surface, the spindle and said rotatable member being rotatable together in both directions of rotation, a spindle-driving member movable by said reciprocable member and having frictional contact with the spindle, the instrument including means arranged to cause magnetic attraction between the spindle and said spindle-driving member in both directions of reciprocation of said reciprocable member so as to hold the spindle and spindle-driving member frictionally together, whereby the position of said spindle and said rotatable member is controlled frictionally by said spindle-driving member during movement of the reciprocable member in both directions.

14. A motion multiplying instrument in which a spindle-driving member is adapted to move in response to the condition to be responded to by the instrument, and a spindle driven by said member carries a rotatable member extending to a circular path substantially larger than the spindle surface, characterized by the spindle-driving member being in frictional driving contact with the spindle, and means arranged to cause magnetic attraction between the spindle and the spindle-driving member, whereby to permit of small diameter of the spindle and consequent large angular movement of the spindle and large linear movement of said rotatable member in said circular path for slight linear movement of the spindle-driving member.

15. A motion multiplying instrument in which a spindle-driving member is adapted to move back and forth in response to the condition to be responded to by the instrument, and a spindle driven by said member carries a rotatable member extending to a circular path substantially larger than the spindle surface, characterized by the spindle-driving member being in frictional driving contact with the spindle, and means arranged to cause magnetic attraction between the spindle and the spindle-driving member in both directions of movement of the spindle-driving member and maintain the spindle against any substantial slippage relative to the spindle-driving member in either such direction of movement, whereby to permit of small diameter of the spindle and consequent large angular movement of the spindle and large linear movement of said rotatable member in said circular path for slight linear movement of the spindle-driving member.

16. A motion multiplying instrument in which a spindle-driving member is adapted to move in response to the condition to be responded to by the instrument, and a spindle driven by said member carries a rotatable member extending to a circular path substantially larger than the spindle surface, characterized by the spindle-driving member being in frictional driving contact with the spindle, and a permanent magnet arranged to cause magnetic attraction between the spindle and the spindle-driving member, whereby to permit of small diameter of the spindle and consequent large angular movement of the spindle and large linear movement of said rotatable member in said circular path for slight linear movement of the spindle-driving member.

17. A motion multiplying instrument in which a spindle-driving member is adapted to move in response to the condition to be responded to by the instrument, and a spindle driven by said member carries a rotatable member extending to a circular path substantially larger than the spindle surface, characterized by the spindle-driving member being in frictional driving contact with the spindle, and a permanent magnet positioned so that the spindle-driving member moves between the permanent magnet and the spindle and so as to cause magnetic attraction between the spindle and the spindle-driving member, whereby to permit of small diameter of the spindle and consequent large angular movement of the spindle and large linear movement of said rotatable member in said circular path for slight linear movement of the spindle-driving member.

18. A motion multiplying instrument in which a spindle-driving member is adapted to move in response to the condition to be responded to by the instrument, and a spindle is driven by said member, characterized by the spindle-driving member being in frictional driving contact with the spindle, and means arranged to cause magnetic attraction between the spindle and the spindle-driving member, whereby to permit of small diameter of the spindle and consequent large angular movement of the spindle for slight linear movement of the spindle-driving member.

19. A motion multiplying instrument in which a spindle-driving member is adapted to move back and forth in response to the condition to be responded to by the instrument, and a spindle is driven by said member, characterized by the spindle-driving member being in frictional driving contact with the spindle, and means arranged to cause magnetic attraction between the spindle and the spindle-driving member in both directions of movement of the spindle-driving member and maintain the spindle against any substantial slippage relative to the spindle-driving member in either such direction of movement, whereby to permit of small diameter of the spindle and consequent large angular movement of the spindle for slight linear movement of the spindle-driving member.

20. A motion multiplying instrument in which a spindle-driving member is adapted to move in response to the condition to be responded to by the instrument, and a spindle is driven by said member, characterized by the spindle-driving member being in frictional driving contact with the spindle, and a permanent magnet arranged to cause magnetic attraction between the spindle and the spindle-driving member, whereby to permit of small diameter of the spindle and consequent large angular movement of the spindle for slight linear movement of the spindle-driving member.

21. A motion multiplying instrument in which a spindle-driving member is adapted to move in response to the condition to be responded to by the instrument, and a spindle is driven by said member, characterized by the spindle-driving member being in frictional driving contact with the spindle, and a permanent magnet positioned so that the spindle-driving member moves between the permanent magnet and the spindle and so as to cause magnetic attraction between the spindle and the spindle-driving member, whereby to permit of small diameter of the spindle and consequent large angular movement of the spindle for slight linear movement of the spindle-driving member.

WILLIAM G. ABBOTT, Jr.

REFERENCES CITED

The following references are of record in the file of this patent:

UNITED STATES PATENTS

| Number | Name | Date |
| --- | --- | --- |
| 687,428 | Heinze, Jr. | Nov. 26, 1901 |
| 1,246,426 | Herman | Nov. 13, 1917 |
| 1,841,543 | McKeown | Jan. 19, 1932 |
| 2,025,081 | Anderson | Dec. 24, 1935 |
| 2,167,641 | Dewan | Aug. 1, 1939 |
| 2,201,836 | McCune | May 21, 1940 |
| 2,239,697 | Buechmann | Apr. 29, 1941 |
| 2,276,755 | Anderson | Mar. 17, 1942 |
| 2,294,869 | Buechmann | Sept. 1, 1942 |
| 2,355,688 | Weingart | Aug. 15, 1944 |

FOREIGN PATENTS

| Number | Country | Date |
| --- | --- | --- |
| 515,342 | Germany | June 2, 1931 |